United States Patent [19]

Lebeau et al.

[11] Patent Number: 5,111,218

[45] Date of Patent: May 5, 1992

[54] SYSTEM FOR ELECTRONICALLY CONTROLLING LED-ARRAY IMAGE PRINTER

[75] Inventors: Donald R. Lebeau, Greenville; Paul J. Kalutkiewicz, Windham, both of N.H.

[73] Assignee: A.B. Dick Company, Chicago, Ill.

[21] Appl. No.: 533,506

[22] Filed: Jun. 5, 1990

Related U.S. Application Data

[62] Division of Ser. No. 252,628, Oct. 5, 1988, Pat. No. 4,963,894.

[51] Int. Cl.$^5$ .............................................. H04N 1/21
[52] U.S. Cl. ................... 346/107 R; 358/296; 346/1.1
[58] Field of Search ............... 346/1.1, 108, 107 R, 346/160; 358/296, 300, 302

[56] References Cited

U.S. PATENT DOCUMENTS

| 4,169,275 | 9/1979 | Gunning | 358/300 |
| 4,342,504 | 8/1982 | Ebner | 346/107 R |
| 4,739,352 | 4/1988 | Gorelick | 354/6 |
| 4,779,071 | 1/1989 | Zeise | 346/160 |
| 4,780,730 | 10/1988 | Dodge | 346/108 |

Primary Examiner—Mark J. Reinhart
Attorney, Agent, or Firm—Morgan & Finnegan

[57] ABSTRACT

A system for controlling an image printer including a scanning LED array is provided. An image printer control unit receives page profile and raster image data and converts the raster image data into parallel image data corresponding to the configuration of the LED array. Advantageously, the image printer control unit optimizes the number of lines of information printed during a scan to reduce splitting of characters between scans and coordinates printhead and photosensitive medium position. Interlaced scanning for high resolution is also provided. In an alternative embodiment image data is received in parallel vertical slices and bands for which no exposure is to be made are skipped.

17 Claims, 6 Drawing Sheets

FIG. 7A

SYSTEM FOR ELECTRONICALLY CONTROLLING LED-ARRAY IMAGE PRINTER

This is a divisional of co-pending application Ser. No. 07/252,628 filed Oct. 5, 1988 now U.S. Pat. No. 4,963,894.

TECHNICAL FIELD

The present invention relates to a system for controlling a scanning LED-array image printer such as the image printer disclosed and claimed in co-pending application Ser. No. 07/112,913 filed Oct. 23, 1987 entitled "Non-Contact LED-Array Image Printer" and co-pending application Ser. No. 850,630 filed Apr. 11, 1986 entitled "LED-Array Image Printer," both commonly assigned herewith and hereby incorporated by reference herein

BACKGROUND AND OBJECTS OF THE INVENTION

An LED-array image printer in accordance with either of the aforementioned applications requires an electronic control system for controlling the position of the photosensitive medium and the activation of the light emitting diodes that make up the scanning LED array.

U.S. Pat. No. 4,739,352 entitled "Electronic Control of Imaging System" discloses and claims a method and apparatus for controlling the activation of diodes in the LED-Fiber Optic Character Printer disclosed in U.S. Pat. No. 4,342,504. The system there disclosed is directed to controlling an array of two staggered rows of light emitting diodes in an LED-fiber optic printer during bi-directional scanning, and includes compensation during reverse scanning for the required tilt angle of the staggered array. The apparatus there disclosed translates raster image scans into parallel bytes of vertical information slices. However, the scanning speed of the foregoing system is limited by the fact that the scanning head must make at least one full scan in each direction across the width of the photosensitive medium before advancing the photosensitive medium. As will be readily appreciated, scanning each and every line in full throughout the entire page length limits the speed at which each page can be scanned In addition, since a slice of information of a preset size must be exposed during every scan, the information to be printed is often split between scans. Thus, accurate registration of each and every scan relative to the preceding and subsequent scan is required.

It is one object of the present invention to provide a system for controlling a high resolution scanning LED-array image printer.

A further object of the present invention is to provide, in a high resolution scanning LED array image printer, a system for controlling printhead position and activation of light emitting diodes in order to increase the speed of the image printer.

Yet a further object of the invention is to provide a control system for an LED-array image printer which reduces the number of split images that occur during scanning of a given page.

These and other highly desirable and unusual results are accomplished by the present invention in a reliable, high speed LED array image printer control system at relatively modest cost.

Objects and advantages of the invention are set forth in part herein and in part will be readily appreciated herefrom, or may be learned by practice with the invention, the same being realized and attained by means of the instrumentalities and combinations pointed out in the appended claims.

SUMMARY OF THE INVENTION

In accordance with the present invention, an electronic control system for an LED array image printer is provided including an image printer control unit for controlling activation of the LED array and intelligent motors which position the scanning LED array printhead relative to the photosensitive medium.

In practice, a document to be typeset is composed on a user terminal in a known manner using known software for this purpose. Graphics information from an optional scanner may be reduced, enlarged, etc. and incorporated into the page to be typeset. The composed page, together with function selections such as font style, resolution and pitch are downloaded to a raster image processor ("RIP"). In the preferred embodiment the RIP constructs a page profile and produces raster format image data to be transmitted to the image printer control unit.

The page profile indicates the number of "bands" of raster data in the document to be printed and the beginning and ending data points $X_1$, $X_2$ within each band line. For convenience, the term "band" as used herein should be construed to mean up to 512 scan lines of information, corresponding to two scans of a linear array having 256 LED's. The raster image data is transmitted to the image printer control unit after the page profile. The raster image data consists of one information bit corresponding to each image pixel, with a binary digit indicating whether an individual LED exposure is to occur at the corresponding pixel. Of course, it is contemplated that switching capability could be provided to reverse the "on" or "off" significance of the binary digits, thereby providing a convenient method of switching between "positive" and "reversal" exposure modes. Based upon the page profile, i.e. $X_1$, $X_2$ for each line, the image printer control unit identifies the end of each line of raster image data and signals the RIP, using a signal here called "LSYNC", to indicate whether the control unit is ready to receive the next line of data.

The image printer control unit includes a "printhead position control circuit" which uses the existing X, Y printhead position and the page profile information, i.e. X and Y position data for bands containing exposure data, to determine the most efficient start position and direction of scan for each segment of data to be printed. That is, the printhead position control circuit calculates the distance from the present X, Y printhead position to the first and last data points $X_1$, $X_2$ of the next band of data to be printed. The printhead position control circuit then compares the calculated values to determine which end of the next data band is closest to the present printhead position. Based upon this determination the image printer control unit commands the intelligent motor controllers to drive the photosensitive medium and printhead into position at the closest end of the next band of data for the start of the next exposure scan.

In accordance with the preferred embodiment of the invention the RIP generates and transmits video image data to the image printer control unit at 1600×1600 dots per inch ("dpi") resolution In the preferred LED-array image printer a linear 256 LED array at a nominal 400 dpi is imaged onto the photosensitive medium with a 50% magnification lens to obtain 800 dpi resolution. In accordance with the present invention the image printer preferably prints at several resolutions, such as 1600×1600 dpi, 800×1600 dpi, and 800×800 dpi. This diverse capability and other advantages are achieved in the following manner by the image printer control unit.

The image printer control unit has memory and a microprocessor for, inter alia, storing raster image data, converting raster image data into parallel slices of vertical data corresponding to the configuration of the LED linear array, and performing other decision making tasks described below.

Preferably, lines of raster image data for at least two bands, i.e. 1024 scan lines, are received and stored by the image printer control unit. For convenience and to conserve memory, the image printer control unit divides each band of 512 scan lines into two alternating sets of interlaced "odd" and "even" lines of scan data having 256 lines each. By way of example only, the first line of data entering the image control unit might be designated as the first "odd" line of data with the second line of data received being designated the first "even" line of data. Thereafter, each alternating line of data received would be designated as odd or even until two sets of interlaced odd and even scan lines corresponding to one band of 512 scan lines are stored in memory.

The image printer control unit also includes a "white line logic circuit" to monitor each line of odd image data as it is received from the RIP. For each line of odd image data the white line logic circuit produces and stores an indication of whether any exposure is to occur on the corresponding scan line. At least two registers or "windows" are provided for storing the white line logic circuit exposure/no exposure indications for at least 512 odd scan lines, i.e. the odd lines from two bands or 1024 lines of data. The image printer control unit is programmed to review the windows of exposure/no exposure indications to decide whether exposure scans can be constructed to minimize splitting of characters to be printed between two exposure scans. Thus, the image printer control unit might determine that an exposure scan of less than a full 256 lines, e.g. the number of LED's in the preferred linear LED array, may permit the image printer to avoid splitting data between two separate exposure scans. By continuously viewing windows for at least two bands of raster image data intelligent scan break determinations can be made taking into consideration subsequent bands of data to be printed.

At least one output buffer is provided to receive raster image data prior to transmission of the data to the printhead. Where an exposure scan is to be truncated at less than 256 lines, the data in the output buffer for all lines below the last line to be exposes is replaced with data indicating that no exposure is to occur. Thus, prior to transfer of data to the printhead, the output buffer contains data corresponding to the illumination of each light emitting diode in the array during that portion of the scan corresponding to the given byte of data. This procedure is repeated for sequential bytes of data to be scanned until the output buffer, preferably having 32 bytes of data storage, is full. Preferably, a second output buffer is also provided so that 32 bytes of data can be loaded into each buffer. The second output buffer is loaded in a similar fashion with the next sequence of data to be printed as the data from the first buffer is transmitted to the LED array at a speed of 8 MH$_z$ with the appropriate diodes corresponding to each byte of data being activated by a stroke pulse.

To convert the raster image data into parallel slices of vertical information corresponding to the configuration of the preferred 256 LED linear array, a "pixel selection logic circuit" strips out each pixel and repackages the pixels into a vertical byte of data, which is then transferred to the LED printhead This is continued for each byte of pixel data until a complete "band" of raster data is transferred to the LED printhead. For scanning in the reverse direction the process is reversed, with the last byte of the band read first and the bits of each byte stripped out in reverse order. After each exposure scan the image printer control unit commands the intelligent motor controller to advance the photosensitive medium by the appropriate distance for the next scan.

For 1600×1600 dpi printing each and every bit of information for both the odd and even lines is read out of memory and sent to the LED array for scanning exposure. In practice, the data for the odd scan lines is read out, the exposure scan is constructed and the data is fed to the LED array via the output buffers and pixel selection logic circuit At the end of the odd scan the control unit commands the intelligent motor controllers to advance the photosensitive medium by one half the distance between the odd lines so that the even scan exposure can be interlaced between the odd scan lines. Since the even and odd scan lines are closely situated the same scan construction for the odd scan, e.g. based on the white line logic circuit, is also used for the even scan.

To obtain 800×1600 dpi only the odd scan lines are printed, with every pixel bit for the entire line being transmitted to the LED array. For 800×800 dpi only the odd scan lines are printed and only every other pixel bit across the line is used to construct the LED exposure scan.

It is also contemplated that both 800 and 1600 dpi resolutions could be printed on the same page in sequential scans. Thus, by way of example only, those portions of a document to be printed at 800×800 dpi, e.g. graphics, could be exposed during a first page scan leaving blank those areas of the page to be exposed at 1600×1600 dpi, e.g. text. The photosensitive medium would then be driven back and the position of the printhead adjusted to expose the 1600×1600 data during a second page scan.

The image printer control unit also interacts with a front panel to receive user commands and display messages, such as error and status messages.

It is also contemplated that the image control unit might be used with a RIP which does not have the capability of constructing a page profile or a RIP which provides vertically configured image data. To accommodate such use, the image control unit is provided with a three position configuration switch to indicate whether the RIP will provide (i) raster data and a page profile; (ii) raster data without a page profile; or (iii) vertically configured data. In the first case the image control unit is operated in accordance with the foregoing description. In the second case, raster data is received and converted to vertical slices for exposure, with or without using the white line logic. Advantageously, the white line logic circuit may e used in this embodiment to monitor bands of "no data" to be skipped or to ensure data is not split between two bands. Finally, where the RIP configures vertical slices of data, i.e., the RIP selects appropriate bits of data from each line and transmits 32 bytes of data at a time to the image control unit, the white line logic circuit might be incorporated into the RIP.

Thus, the system according to the invention obtains high speed, high resolution scanning in an LED array image printer by controlling the printhead in an efficient manner and by configuring the exposure scan data transmitted to the LED array in a novel manner.

It will be understood that the forgoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate principles and preferred embodiments of the present invention, and together with the description serve to explain the principles of the invention, in which.

DETAILED DESCRIPTION OF THE PREFERRED EMBODIMENTS

Figure 1:
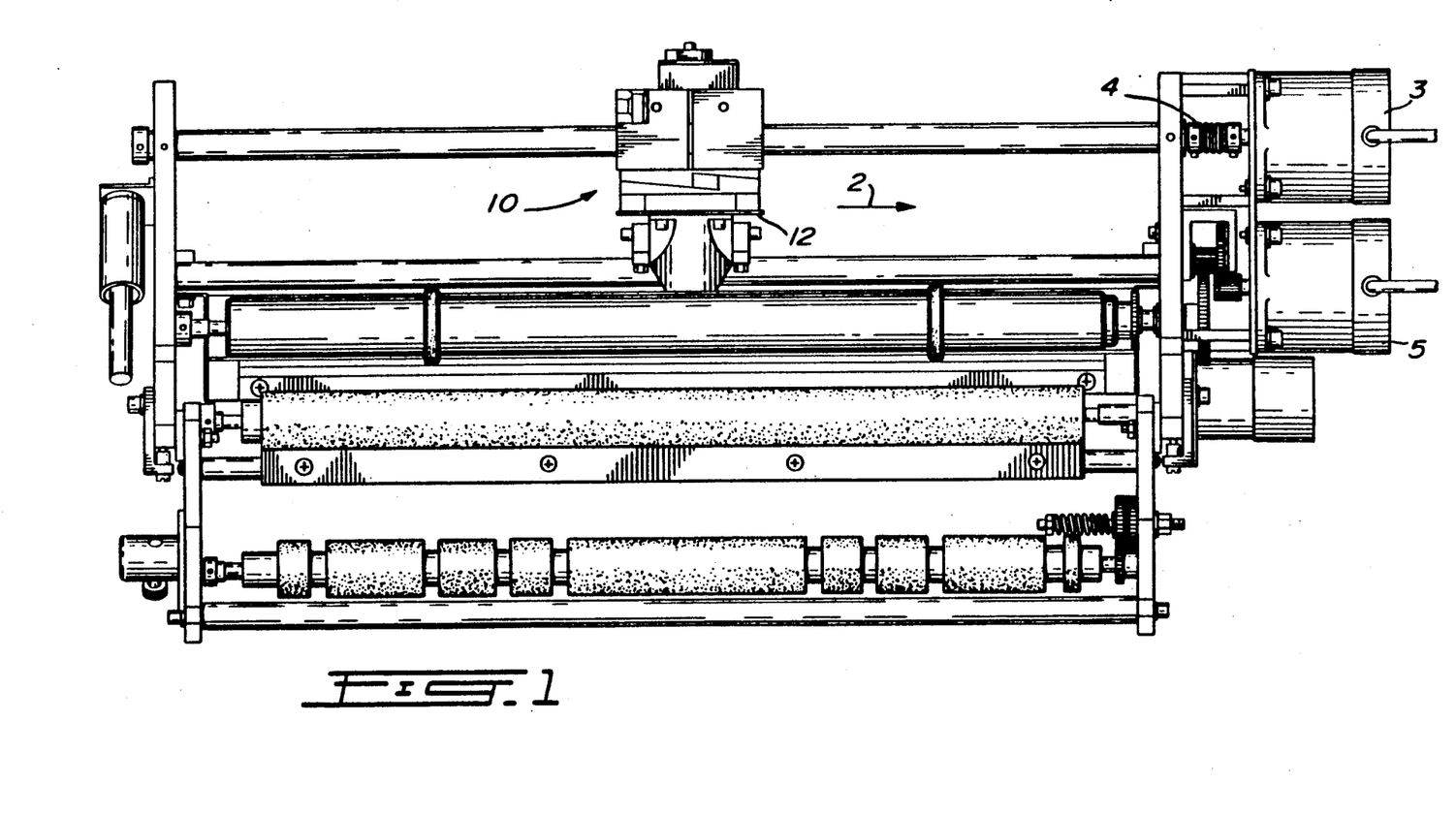
FIG. 1 is a top plan view of a printhead carriage and photosensitive medium advance mechanism relating to the present invention.

The system of the present invention finds particular application to the image printer shown in FIG. 1 and described in the foregoing application Ser. No. 07/112,913. Briefly described, the scanning printhead 10 is driven across the photosensitive medium in the direction indicated by arrow 2 or in the opposite direction by a threaded lead screw (not shown) driven by carriage drive motor 3 via a coupling 4. A linear LED array mounted to a substrate 12 is imaged during a non-contact scan onto the image plane where the photosensitive medium (not shown) is disposed. The position of the photosensitive medium is controlled by motor 5 which drives a gear and roller mechanism as more fully explained in the foregoing application. For the purposes of the following description it should be appreciated that motor 3 controls the transverse position of the scanning head relative to the photosensitive medium and motor 5 controls the position of the photosensitive medium perpendicular to the scanning direction of printhead 10.

Figure 2:
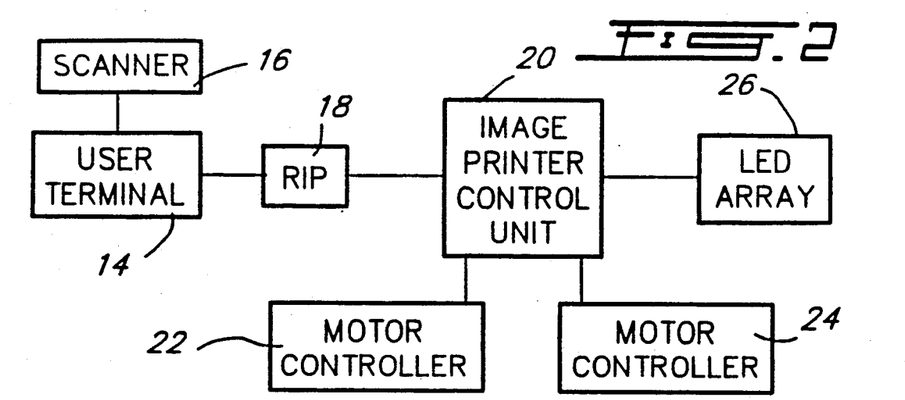
FIG. 2 is a block diagram illustration of the components of a printer system in accordance with the invention.

FIG. 2 is a block diagram illustration of the components of the image printing system. A user terminal 14 is provided for inputting typesetting information and, if desired, a scanner 16 may be provided for inputting scanned graphic material. A raster image processor (RIP) 18 receives typesetting information from terminal 14 and formats the information into a raster image pattern of data in a known manner for transmission to image printer control unit 20. The raster image processor also creates and transmits a page profile of the document to be printed. Image printer control unit 20 controls the scanning LED array 26 and motor controllers 22, 24 connected to motors 3, 5 (see FIG. 1). User terminal 14 may be a personal computer, such as an IBM personal computer model AT, and raster image processor 18 may be a processor commercially available from Chelgraph, Ltd. Motor controllers 22, 24 are preferably intelligent motor controllers such as intelligent stepper motor controllers available from Magnon Engineering, Inc. The LED array is preferably an integrated circuit LED array such as either of model nos. TPMP 8160 or 7160 available from AEG Telefunken Corporation. As described more fully below, the image printer control unit is an intelligent controller capable of receiving bytes of raster image data from the RIP and formatting the data into parallel bytes of vertical image slices matching the configuration of the scanning LED output device. The image printer control unit determines optimum scan configurations and coordinates LED activation with printhead position.

Figure 3:
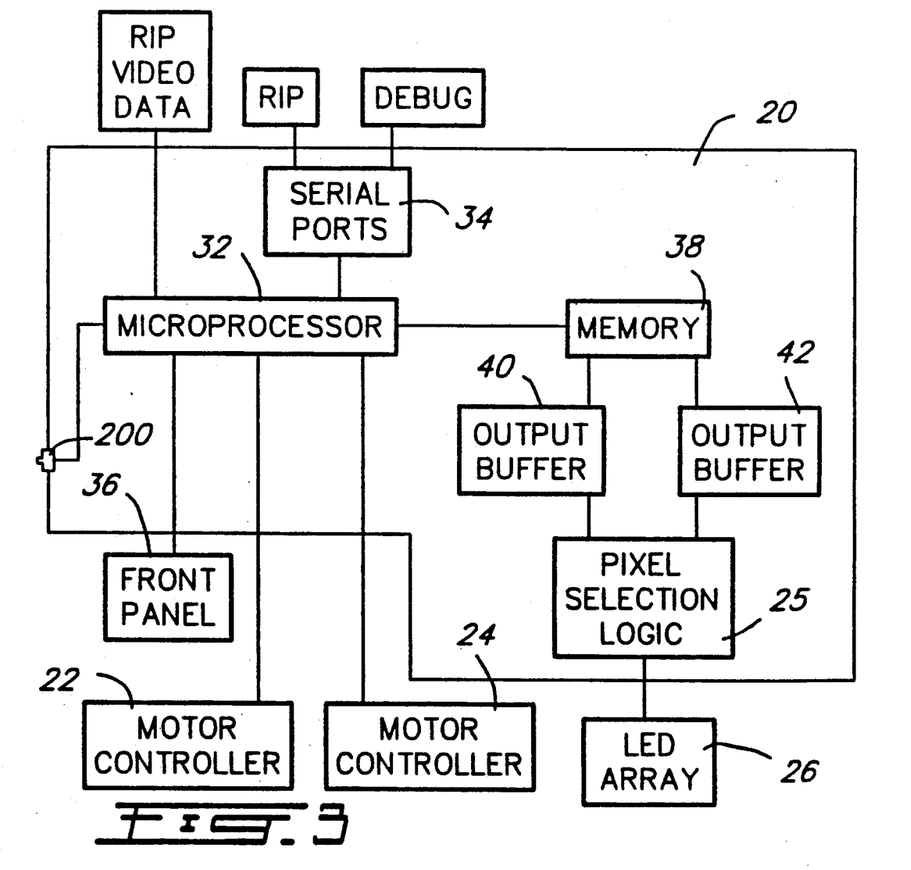
FIG. 3 is a block diagram illustration of the image printer control unit in accordance with the invention.

Referring now to FIG. 3, there is illustrated in block diagram form the basic components of the image printer control unit 20. At the heart of the image control unit is a microprocessor 32, such as a Motorola model 68020 32 bit processor. Through serial ports 34 microprocessor 32 receives protocol communications and page profile information from RIP 18. Command and status information is transmitted across this line as well. Preferably, a second serial port is provided as a "debug" port to permit access to an erasable programmable ROM provided on the microprocessor board in a known manner for this purpose. Microprocessor 32 also receives video data from RIP 18 and user input from an image printer front panel 36. The image printer control unit also includes approximately four megabytes of dynamic random access memory ("DRAM") 38. Appropriate DRAM's and controllers for use with the invention are available from National Semiconductor Inc. DRAM 38 is accessed by microprocessor 32 and output buffers 40, 42 which receive and store data from memory 38. The data is then packed into vertical bytes by pixel selection logic 25 and transmitted to LED array 26. In the preferred image printer arrangement an image of a linear 256 LED array having a nominal 400 dip is imaged by a 50% magnification lens onto a photosensitive medium so that 800 dpi resolution is obtainable from a single scan and 1600 dpi resolution is obtainable from two interlaced scans.

In use, the page to be set is composed on the display of user terminal 14 using appropriate software within the skill in the art. This includes entering text and scanned graphics in appropriate page regions and selecting type font, resolution and print size. So constructed, the page is downloaded to memory in RIP 18. The RIP constructs a page description including a page profile and raster image data to be transmitted to the image printer control unit 20. If further information is required, such as font information not currently available is the RIP memory, the RIP will request this information from the user terminal.

The page profile downloaded to the printer control module indicates, inter alia, how many "bands" of raster image data will be sent from RIP 18 to module 20, as well as pertinent information about each "band", e.g.

the position of the first and last exposure in each band. For convenience only, a "band" is defined herein as consisting of up to 512 scan lines by up to 20,000 pixels across. As discussed more fully below, however, an exposure scan need not include a full 512 scan lines. In the discussion herein a bit having a significant digit "1" corresponds to an indication of an LED exposure of a pixel of information and a "0" in a bit indicates a pixel to be left blank, i.e. where no exposure is to occur. Of course designations such as "true" and "false" are equally applicable since it is contemplated that the meaning of each designation could be reversed to accommodate both "positive" and "reversal" exposures.

Figure 4:
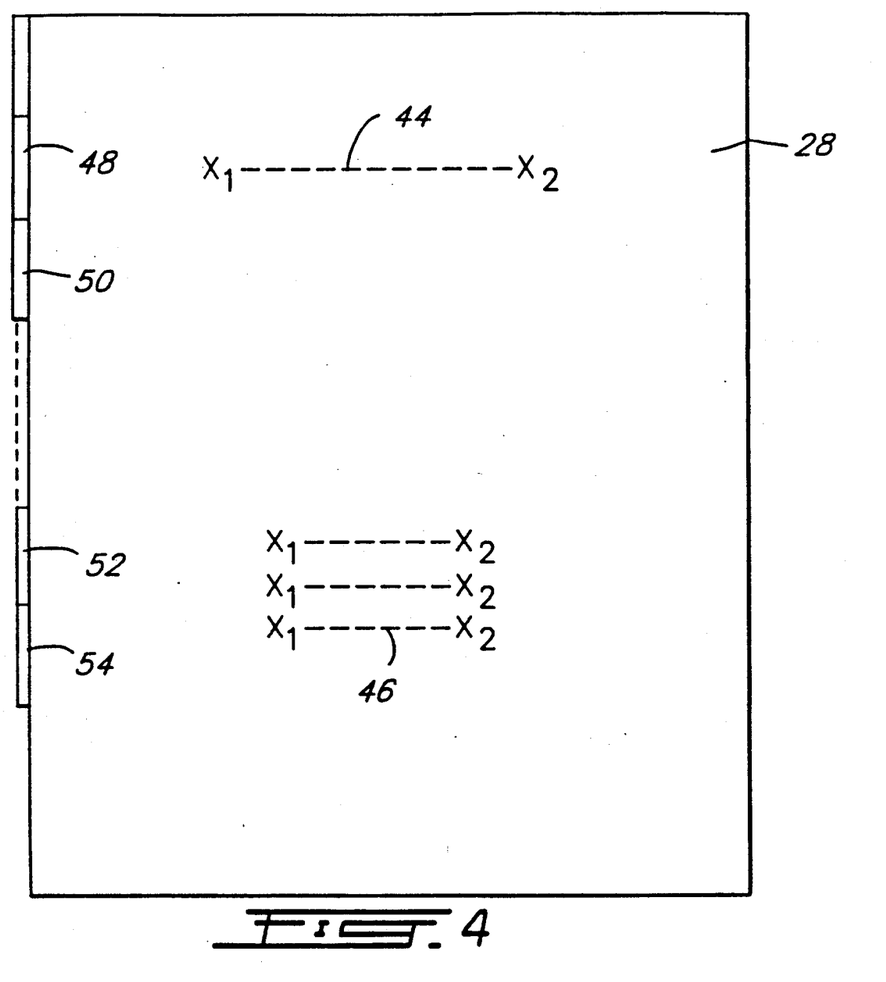
FIG. 4 is an illustration of the information contained in a page profile transmitted from the RIP to the image printer control unit in accordance with the invention.

FIG. 4 is an illustration of the information contained in the page profile. For each line of a page 28 illustrated in FIG. 4, X1 indicates the position of the first pixel of data and X2 indicates the position of the last pixel of data to be exposed during a scan of that line. For each line where no information is to be printed, X1 and X2 are both set equal to zero, indicating no start and stop exposure positions. As illustrated in FIG. 4, text is to be printed on the line indicated at 44 and in the region designated 46. Brackets 48, 50, 52, 54 illustrate hypothetical bands of data for which lines of raster image data are to be generated and sent to the image printer control unit. For each scan line the page profile tells the image printer control unit the coordinate location of X1 and X2. Thus, for the line designated 44 the page profile provides a numerical indication of the location of X1 and X2. By way of example however, X1, and X2 lines within bracket 50 are set equal to zero, indicating that no information is to be printed within that band. The next region of data to be printed 46 occurs in bands 52, 54 and corresponding X1, X2 values for each line to be exposed will be given. As will readily be appreciated, from the page profile containing this information the image printer control unit can determine the optimum scan pattern. Thus, assuming the printhead scans line 44 from left to right, the image printer control unit may direct the printhead from the location of X2 on line 44 directly to the uppermost location of X2 in region 46, also instructing the printhead to commence scanning of region 46 from right to left. Of course, the printhead may also be directed from the existing position at the beginning of a document exposure directly to the first exposure region. In addition, once the furthest X2 for any line in the exposure scan is reached the printhead can be directed to terminate scanning and assume the correct position for the next exposure scan. As a practical matter, positioning of printhead 10 is accomplished by commanding motor controllers 40, 42 to activate motors 3, 5 to drive the scanning head and photosensitive medium to the desired line and scan location. Advantageously, intelligent direction of the printhead in this manner conserves valuable printing time and reduces wear and tear on mechanical devices by eliminating unnecessary motor moves and scanning of bands where no exposure is to occur, e.g. between line 44 and region 46 of FIG. 4.

Figure 5:
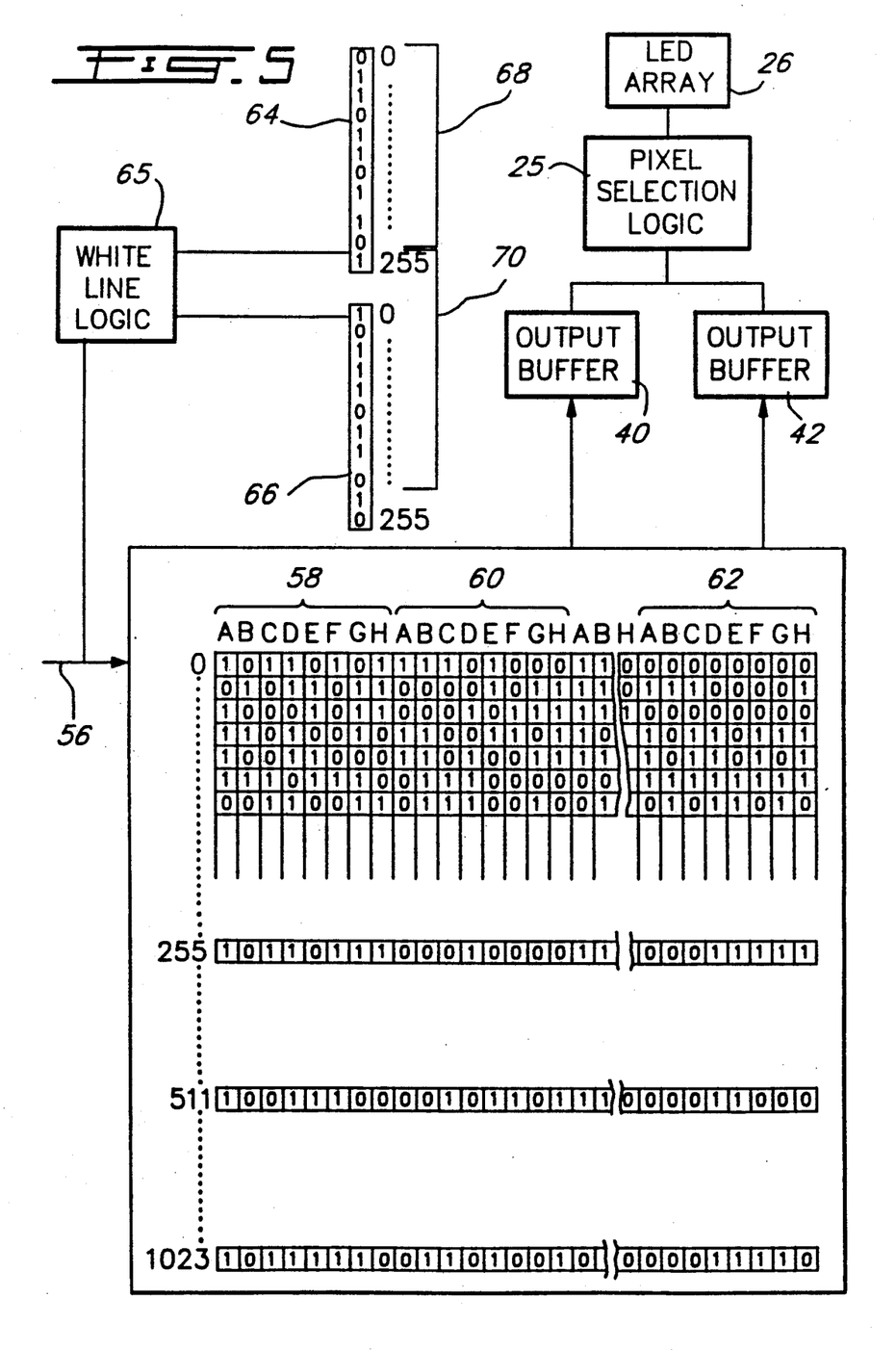
FIG. 5 is a partial functional block diagram of the image printer control unit illustrating the method of controlling the LED array in accordance with the invention.

Referring to FIG. 5, a functional block diagram illustration of a portion of the image printer control unit, the operation of the control unit to construct optimum scan configurations from the raster data and to convert raster data into parallel vertical data slices for exposure will now be described. Control unit 20 has enough memory 38 to store at least two full bands of video data, i.e. data for 1024 scan lines, at one time. For simplicity, the discussion herein will be limited to the case where two such bands of data are processed. It should be understood, however, that multiple bands of data may be processed in order to facilitate optimum band construction. As illustrated, raster image data is received from the RIP via line 56 and stored in a portion of memory 38. For purposes of illustration each line of data illustrated in memory 38 is assumed to correspond to one scan line, with all scan lines and bands having the same width. Needless to say, this need not be the case and data could be stored in memory 38 in any addressable manner. Control unit 20 determines from the page profile when each line of data is complete and a corresponding signal "LSYNC" is sent by the control unit to the RIP indicating when each complete line of data has been received.

One band of data from RIP 18 includes 512 lines of data. The image printer control unit alternately designates each of the 512 lines of data into alternating "odd" and "even" lines, resulting in two interlaced groups of 256 lines. For each line up to 20,000 bits of data containing pixel "on/off" or "true/false" exposure indications (illustrated by a "0" or "1" in FIG. 5) are stored, depending upon the width of the band which, in turn, depends upon page width As illustrated in FIG. 5, bytes 58, 60, 62 each contain eight bits "A" through "H" of pixel data for each odd and even line of data.

In accordance with the invention, a "white line" logic circuit is provided which monitors each odd line of data received from RIP 18. For purposes of illustration, where no information is to be printed on a given odd line a "0" is entered into a corresponding white line register bit. If any information is to be printed on an odd line a "1" is entered into the corresponding register bit. In this manner the white line logic circuit keeps track of all lines where exposures are and are not to be made. As illustrated in FIG. 5, at least two white line registers 64, 66 of 256 bits each are provided to indicate which odd lines of the two bands of data stored in memory 38 require an exposure. Based upon the data in registers 64, 66 the image printer control unit determines the optimum scan configurations so that as little printed information as possible will be divided between different exposure scans. By way of example only, the lines included within bracket 68 might be designated for exposure during one LED array scan and the lines included within bracket 70 might constitute the next scan. Significantly, the control unit merges the data remaining from the first band into the next band to construct the largest exposure scan possible which will not result in split imaging. As data is transferred to output buffers 40, 42 memory 38 and, consequently, registers 64, 66 are replenished from RIP 18 in the manner disclosed above.

To output data from memory 38 to output buffers 40, 42 one byte of data for 256 lines of data is read from memory 38 into an output buffer In order to convert the data in the output buffer into the appropriate configuration of the LED array during forward scanning, the first bit "A" of each line of data in the output buffer is stripped out of the output buffer in parallel fashion by the pixel selection logic and sent to the array 26. Where less than a full scan is to be exposed all output buffer data bits for lines below the termination line are filled with zeros, indicating no exposure, with any remaining exposures for this area to be included in the subsequent scan. Of course, control unit 20 also adjusts the distance the photosensitive medium is advanced by motors 3,5 for the next exposure scan. After data is sent to LED array 26 a stroke pulse activates the appropriate corresponding light emitting diodes to make an exposure. In the preferred embodiment including two output buffers the second buffer is filled with data as data from the first buffer is sent to the LED array and corresponding exposures are made. To ensure a continuous flow of information to the printhead an empty buffer will interrupt microprocessor 32 to demand that the buffer be replenished.

During forward scanning in this example data bits "A" through "H" of each byte are stripped in the parallel manner described above across each byte 58, 60 through 62 until complete lines have converted been and scanned. For reverse scanning, however, byte 62 would be read from memory first and the parallel stripping of bits would be conducted working right to left from bit "H" to bit "A".

Figure 6:
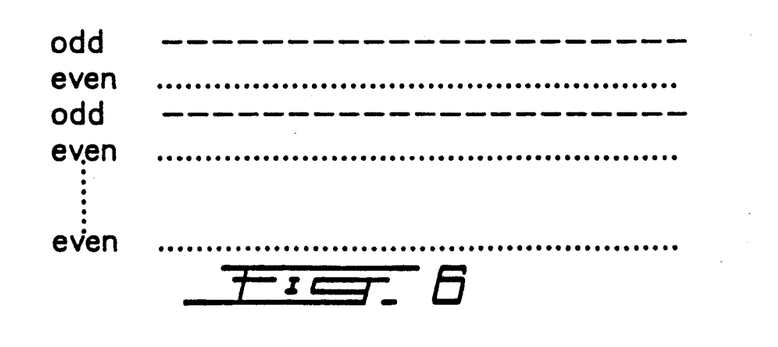
FIG. 6 is an illustration of interlaced scanning utilized in one embodiment of the invention to provide high resolution scanning.

In order to achieve 1600×1600 dpi resolution each and every bit of each and every scan line would be read, converted and transmitted to LED array 26 for exposure. In practice, since the preferred LED array includes 256 diodes, all odd line data is exposed during one scanning sweep and the photosensitive medium is advanced by one half the distance between the odd scan lines. On the return scan all even line data is exposed interlaced between the odd line scans. The result of this interlaced scan pattern is illustrated in FIG. 6.

To obtain 800×1600 dpi only the odd scan lines are exposed. For this resolution every bit of data across the line is exposed. To obtain 800×800 dpi only the odd scan lines are exposed and only every other bit of data across the line, e.g. bits "A", "C", "E", etc., are exposed.

In order to print areas of different resolution on the same page it is contemplated that the page would first be scanned at one resolution, e.g. 800×800 dpi for graphics, leaving blank those areas of the page where a different resolution is to be printed. Intelligent motor controllers 22, 24 would then be directed to drive the photosensitive medium and printhead back in close registration to the appropriate positions for a second scanning exposure of those regions to be printed at a second resolution, e.g. 1600×1600 dpi for text.

Figure 7A:
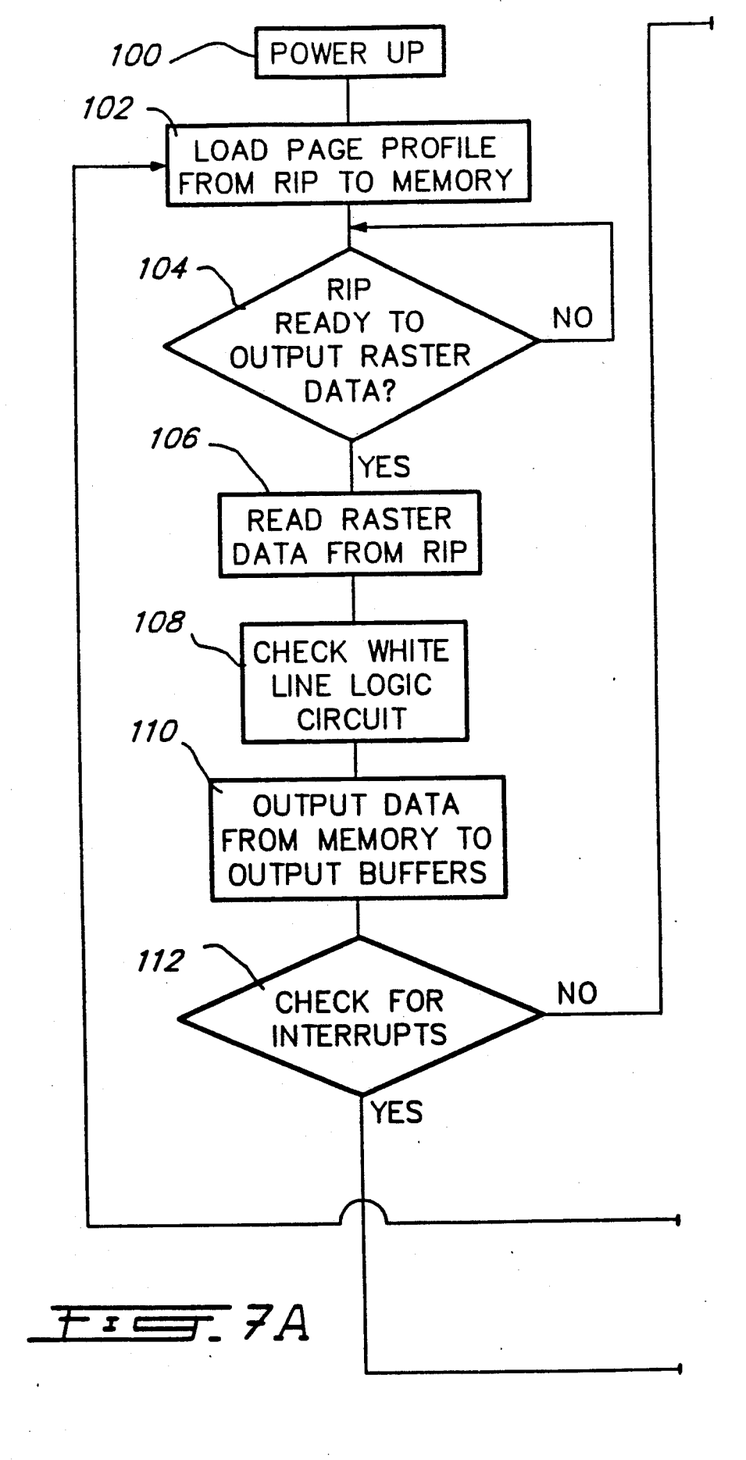
FIG. 7 is a flow chart illustrating a decision-making process in accordance with the present invention.
Figure 7B:
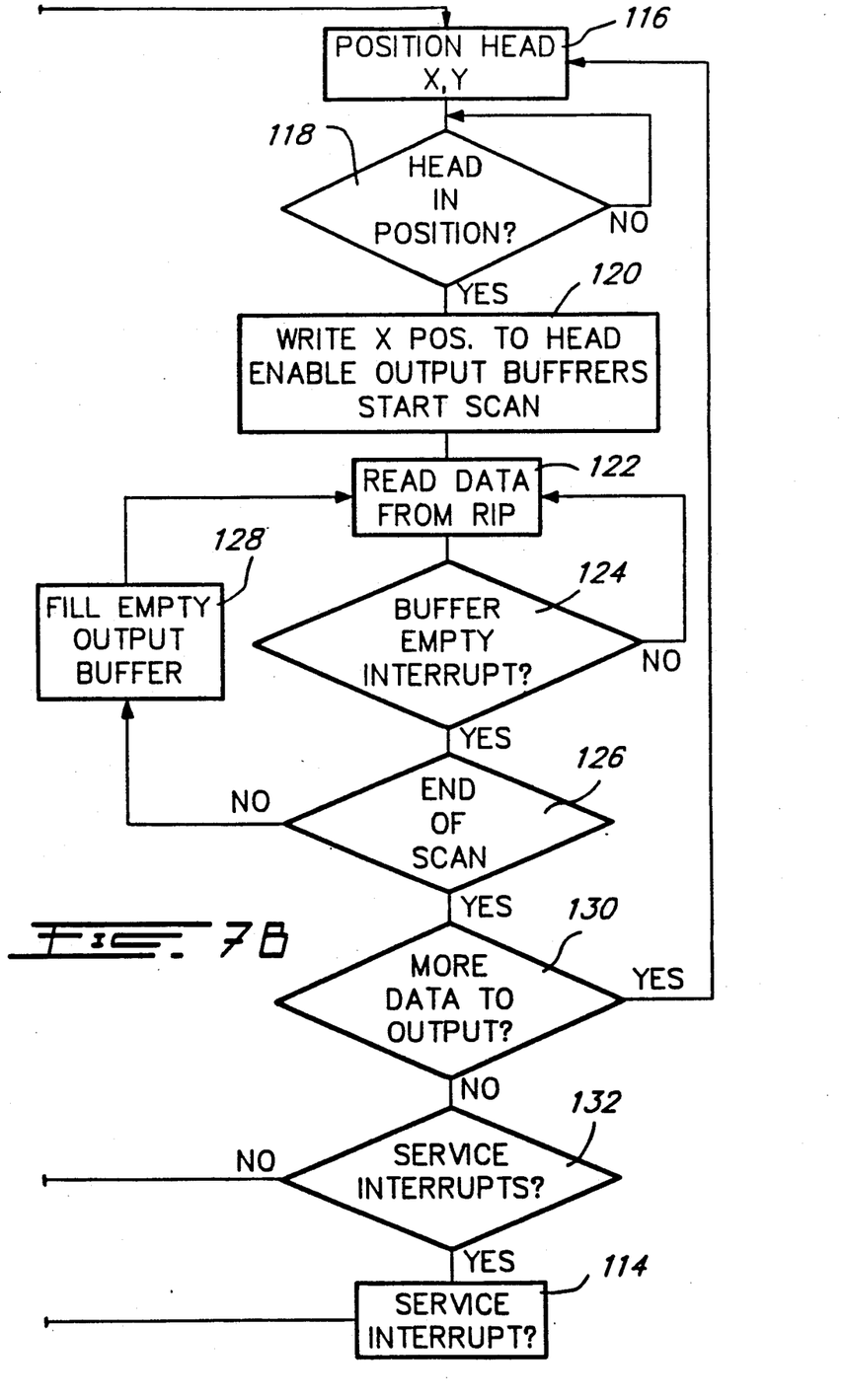

Microprocessor 32 also interacts with front panel 36, which gives the user control over certain functions such as advancing and cutting the photosensitive medium or switching on/off line. The front panel also displays error and status messages. Prior to commencing printing microprocessor 32 reviews the status of the front panel and the printer in general to ensure, for example, that the image printer is on line and that photosensitive medium has been loaded FIG. 7 is a flow chart illustrating one form of decision-making process executed by the control unit. At step 100 the control unit powers up, performs diagnostics, checks the motor position, possibly driving the motors to a "home" position, and signals the RIP that the control unit is ready. As shown at step 102, the control unit receives the page profile from the RIP and loads this information into memory. After receiving and storing the page profile the control unit inquires whether the RIP is ready to download the raster image data. If not, the control unit repeats this inquiry step, shown at 104, until the RIP is ready to output the raster image data.

When the RIP is ready to output raster data, the control unit receives and loads the raster data into memory, as shown at step 106. As the raster data is received it is compared against the page profile, which now constitutes a look-up table in memory. In this manner the control unit determines and monitors such things as the end of each scan line of data.

Having received and stored the raster image data, the control unit checks the white line logic circuit to determine whether the scan is to be truncated and sets up pointers in memory as to the appropriate scan configuration (see step 108). After the scan configuration has been determined and the pointers set the corresponding raster data is transferred from memory to the output buffers (step 110). Of course "no exposure" indications are provided to the output buffers where a band is to be truncated.

For purposes of illustration, step 112 is shown as a service interrupt check, showing that the control unit checks the front panel for user indicated interrupts on the front panel and/or service requirements, e.g. out of paper or film. If an interrupt is found a front panel display and/or user prompt sequence may be triggered in order to correct the problem (step 114). Where no interrupts are found, the control unit positions the printhead by driving motors 3, 5 (See FIG. 1) based on X, Y coordinates derived from the existing head position and the page profile (step 116). At this point a determination has been made as to the direction of scan. As shown at step 118, the control unit performs an inquiry step until the printhead is correctly positioned.

With the printhead correctly positioned for scan and the output buffers filled with exposure data, the control unit is now ready to start an exposure scan. As shown at step 120, the control unit transmits a scan destination X position to the printhead and enables the output buffers. The scan destination X position is determined from the page profile.

The control unit, and more specifically the pixel selection logic, reads exposure data from the output buffers in the appropriate order, i.e. parallel bit stripping corresponding to the scan direction, and transmits the exposure data to the array(step 122). After the exposure data is received by the array a stroke pulse activates any LED's for which exposure is indicated. This is repeated for all data in each output buffer until the scan is complete. Naturally, the data output speed and printhead scanning rate are synchronized to provide a controlled exposure. Advantageously, one output buffer is filled with data as the data from the other output buffer is stripped out and transmitted to the LED array.

In order to ensure a continuous flow of exposure data to the printhead a buffer empty interrupt (step 124) is triggered when either buffer becomes empty. When this occurs the microprocessor will be interrupted from any other task, e.g. receiving more data from the RIP (step 104 et seq.) to refill the buffer, if necessary. When interrupted for an empty buffer (step 124) the microprocessor will determine (step 126) whether the printhead has reached the end of that particular scan. If not, the microprocessor will direct that the empty buffer be refilled so that the exposure scan can continue uninterrupted (see steps 128, 122). This cycle of operation is continued until an entire exposure scan has been made, at which time the control unit microprocessor will determine whether there is more data to be outputted for this page (step 130). If the page is not complete, the control unit will return to step 116 to position the printhead for the next exposure scan. Steps 116 through 130 are repeated until all data for the page has been outputted.

Once the page has been completely outputted, the control unit again checks for service interrupts (step 132) and, absent a service interrupt, signals the RIP that the control unit is ready for the next job. As will readily be appreciated, the microprocessor control unit continues to receive and process raster data from the RIP, e.g. steps 104 through 110, as data is outputted from the output buffers to the LED array for exposure. Of course, it is contemplated that the communications protocol between the control unit and the RIP should account for interruptions in such communications and permit data transmission to resume after full communication is restored.

In the foregoing description it is assumed that the image control unit will be used with a RIP which provides a page profile and image data in a traditional raster format. However, it is contemplated that the image control unit may be used with a RIP which provides raster format data but is not capable of providing a page profile. It is further contemplated that the image control unit might be connected to a RIP which provides image data pre-arranged into 32 byte vertical slices. To accommodate the foregoing alternatives, the image control unit is provided with a configuration switch 200 (see FIG. 3) which indicates the type of RIP and, hence, the configuration of information to be received Preferably, configuration switch 200 is a three position switch which is set according to the type of RIP connected to the image control unit.

In a first alternative embodiment image control unit 20 is connected to a RIP which provides rasterized image data but no page profile. This fact is communicated to RIP 20 by configuration switch 200. Under these circumstances, image control unit 20 will not receive a page profile and would ordinarily have to scan each and every band of data, converting the raster format data for each band to vertical exposure data slices. However, in this configuration the white line logic circuit is preferably used to view each band of data to determine whether any exposures are to be made in that band. If not, microprocessor 32 instructs the motor controllers to increment the photosensitive medium without scanning the printhead 10. In this manner, the output speed of the unit may be markedly increased by skipping bands where no data is to be printed.

In a second alternative embodiment of the invention the RIP is configured to transmit 32 byte slices of vertically configured image data to the output unit 20. This requires a RIP which recognizes each line of data and selects corresponding bits of data for every other line of 256 lines of data. In short, the RIP selects vertical slices of odd and even bands of data to be transmitted to output unit 20. It is believed to be within the capability of RIP manufacturers to adapt a RIP to this operating format on request. In this embodiment, output unit 20 receives and loads each vertical slice of data directly into one of the output buffers. Of course, in this embodiment the pixel selection logic is deactivated so that data may be transmitted to the printhead in the form received from the RIP. Advantageously, receiving and transmitting data in vertical slices increases throughput because no further data processing is performed within the control unit. To further increase operating speed, the phototypesetter is preferably operated at constant high resolution without implementation of the white line logic. The third position of configuration switch 200 informs control unit 20 that vertical slice data will be received from the RIP and implements the foregoing changes in the mode of operation.

Thus, the image printer control system according to the invention advantageously coordinates printhead position and direction of scan with activation of light emitting diodes to obtain high resolution printing. Advantageously, the system is capable of minimizing the number of characters split between scans. This reduces the number of abutting exposure scans that must be aligned with a high degree of accuracy to ensure that visible print discrepancies between exposure scans do not occur. This remarkable result increases reliability of the system and minimizes wear and tear on and increases the throughput of the mechanical drive train elements.

To the extent not already indicated, it will be appreciated that the invention in its broader aspects is not limited to the specific embodiments and configurations herein shown and described, but departures may be made therefrom within the scope of the accompanying claims without departing from the principles of the invention and without sacrificing its chief advantages.

What is claimed is:

1. A method of controlling an image printer including an LED array printhead that is scanned perpendicular to the direction of travel of the photosensitive medium being exposed, comprising the steps of:
   providing raster image data to an image printer control unit;
   storing at least a portion of said raster image data in memory within said image printer control unit;
   designating as exposure bands each set of exposure data within said stored raster image data corresponding to one complete scanning exposure of the LED array;
   identifying from said exposure data for each exposure band any scan line for which no information is to be printed;
   terminating the exposure scan of the LED array on a scan termination line where no information is to be printed; and
   commencing the next exposure scan on a line subsequent to said exposure scan termination line.

2. The method according to claim 1 further comprising the steps of:
   directing the printhead to skip lines for which no information is to be printed to commence scanning exposure on the next line for which an exposure is to occur.

3. The method according to claim 2 further comprising the step of:
   directing the printhead to terminate a first exposure scan and advance to the next scan where no further exposure is to be made during the remaining portion of the first scan.

4. The method according to claim 2 wherein motor controlling means drives the scanning printhead and advances the photosensitive medium.

5. A system for controlling an LED array image printer wherein the LED array of an image printer is scanned perpendicular to the direction of travel of a photosensitive medium, comprising:
   user terminal means for composing a document to be exposed by the scanning LED array;
   raster image processor means for receiving information from said user terminal means and for creating serial raster image data corresponding to pixels to be exposed onto the photosensitive medium in order to print said document;

image printer control unit means for receiving said raster image data from said raster image processor means, said image printer control unit converting serial raster image data into parallel slices of data for controlling activation of the diodes of the scanning LED array during scanning to expose said document onto the photosensitive medium, said printer control unit means identifying scan lines for which no exposure is to be made and terminating the exposure scan on one such line.

6. A system for controlling an LED array image printer wherein an LED array is scanned perpendicular to the direction of travel of a photosensitive medium to expose bands of scan lines, the system comprising;

user terminal means for composing a document to be exposed by the scanning LED array;

raster image processor means for receiving document information from said user terminal means and for creating (i) a page profile, and (ii) raster image data corresponding to pixels to be exposed by the LED array onto the photosensitive medium in order to print said document; and image printer control unit means for receiving said page profile and said raster image data from said raster image processor means, said image printer control unit controlling the position of the LED array relative to the photosensitive medium based upon said page profile, said image printer control unit converting serial raster image data into parallel slices of data for controlling activation of the diodes of the scanning LED array during scanning to exposure said document onto the photosensitive medium, said printer control unit means identifying scanlines for which no exposure is to be made and terminating the exposure scan on one such line.

7. The system according to claim 6 wherein said image printer control unit means controls motor controller means for positioning the scanning LED array and the photosensitive medium relative to each other.

8. The system according to claim 7 wherein said image printer control unit means directs said motor controller means to advance the photosensitive medium between exposure scans by one half the distance between the first exposure scan lines in order to obtain an interlaced scanning exposure.

9. The system according to claim 7 wherein said image printer control unit controls said motor means and the LED array to cause the LED array to conduct a first scanning exposure of said document onto the photosensitive medium, whereafter said image printer control unit means directs said motor controller means to drive the photosensitive medium and scanning LED array back to at least one region on said document for a second scanning exposure.

10. The system according to claim 9 wherein said first scanning exposure is made at a first resolution and said second scanning exposure is made at a second resolution.

11. The system according to claim 10 wherein said first resolution is 800 dots power inch and said second scanning resolution is 1600 dots per inch.

12. The system according to claim 11 wherein said image printer control unit prints said second resolution by directing said motor controller means to advance the photosensitive medium between even and odd LED array exposure scans by one half the distance between scan lines in order to provide an interlaced scanning exposure.

13. In a system for controlling activation of light emitting diodes in an image printer including a scanning LED array printhead, the system including means for converting raster image data received in bands from a raster image processor into parallel slices of video data for scanning exposure, the improvement comprising:

means for identifying scan lines within a band of image data where no information is to be printed;

means for causing an exposure scan corresponding to the band of image data to be terminated on a scan line where no exposure is to occur.

14. The system according to claim 12 further comprising means for causing the LED array printhead to skip bands of data where no exposure is to occur.

15. A system for controlling an LED array image printer wherein the LED array of an image printer is scanned perpendicular to the direction of travel of a photosensitive medium, comprising;

user terminal means for composing a document to be exposed by the scanning LED array;

raster image processor means for receiving information from said user terminal means relating to said document and creating raster image data corresponding to pixels to be exposed onto the photosensitive medium in order to print said document, said raster image processor means transmitting parallel vertical slices of image data corresponding in length to the size of the LED array; and image printer control unit means for receiving said parallel vertical slices of image data and transmitting said parallel vertical slices of image data to said LED array to control activation of the LED array during scanning exposure, said image printer control unit means including means for identifying bands of raster image data for which no exposure is to be made and causing bands where no exposure is to be made to be skipped.

16. The system according to claim 15 wherein pairs of exposure scans are interlaced.

17. A method of controlling an image printer including an LED array printhead scanned perpendicular to the direction of travel of the photosensitive medium being exposed, comprising the steps of:

providing raster image data to an image printer control unit;

storing at least a portion of said raster image data in memory within said image printer control unit;

designating as exposure bands each set of exposure data within said stored raster image data corresponding to one complete scanning exposure of the LED array;

identifying each scan line within each said band of exposure data for which no scanning exposure is to be made;

causing said LED array printhead to skip exposure bands for which no exposure is to be made.

* * * * *

UNITED STATES PATENT AND TRADEMARK OFFICE
CERTIFICATE OF CORRECTION

PATENT NO.  : 5,111,218
DATED       : May 5, 1992
INVENTOR(S) : Donald R. Lebeau and Paul J. Kalutkiewicz It is certified that error appears in the above-identified patent and that said Letters Patent is hereby corrected as shown below:

In Col. 1, line 18, after "herein" insert ".".

In Col. 1, line 47, after "scanned" insert ".".

In Col. 2, line 67, after "resolution" insert ".".

In Col. 4, line 8, after "printhead" insert ".".

In Col. 4, line 23, after "circuit" insert ".".

In Col. 8, line 24, after "width" insert ".".

In Col. 8, line 55, after "buffer" insert ".".

In Col. 9, line 51, after "loaded" insert ".".

In Col. 11, line 27, after "received" insert ".".

Signed and Sealed this

Sixth Day of July, 1993

Attest:

MICHAEL K. KIRK

*Attesting Officer*   Acting Commissioner of Patents and Trademarks